United States Patent
Hohnen et al.

(10) Patent No.: US 6,827,302 B2
(45) Date of Patent: Dec. 7, 2004

(54) METHOD AND DEVICE FOR THE IN SITU DISPOSAL OF INCONTINENCE ARTICLES

(75) Inventors: Horst Hohnen, Schwalmtal (DE); Gottfried Thomas, Hückelhoven (DE)

(73) Assignees: SVI Anlagen GmbH, Brüggen (DE); AHE GmbH, Hückelhoven (DE)

( * ) Notice: Subject to any disclaimer, the term of this patent is extended or adjusted under 35 U.S.C. 154(b) by 180 days.

(21) Appl. No.: 10/149,141

(22) PCT Filed: Nov. 19, 2001

(86) PCT No.: PCT/EP01/13352
§ 371 (c)(1),
(2), (4) Date: Aug. 27, 2002

(87) PCT Pub. No.: WO03/009942
PCT Pub. Date: Feb. 6, 2003

(65) Prior Publication Data
US 2003/0019961 A1 Jan. 30, 2003

(30) Foreign Application Priority Data
Jul. 20, 2001 (DE) .................. 201 11 828 U

(51) Int. Cl.[7] .................................. B03B 9/06
(52) U.S. Cl. ................. 241/46.13; 241/21; 241/23
(58) Field of Search .................. 241/17, 21, 23, 241/46.06, 46.13

(56) References Cited

U.S. PATENT DOCUMENTS 4,664,320 A * 5/1987 Steffens .................. 241/60
5,292,075 A 3/1994 Bartlett
5,429,311 A * 7/1995 Cina et al. ................. 241/14

FOREIGN PATENT DOCUMENTS

DE 198 53 520 A1 5/2000

\* cited by examiner

Primary Examiner—Lowell A. Larson
(74) Attorney, Agent, or Firm—Friedrich Kueffner

(57) ABSTRACT

The device for the in situ disposal of incontinence articles comprises a basic housing (11) in which is placed a device (20) made of a drum-type housing (21) with an upper filling opening (22) and a cylindrical drum (30) placed in the inner space (23) of the housing (21), stationary or which can be set rotating about a horizontal axis of rotation (24) in one direction or alternately by means of a first driving device (25), with a filling opening (32) for the material to dispose of and with two wall plates (33, 34) closing both drum openings (30a, 30b) on the front side, the first wall plate (33) being connected with the drum housing and the second wall plate (34) being configured displaceable by means of a second driving device (35) in the drum rotation axis longitudinal direction or displaceable and rotatable about its center axis, whereby both front side drum wall plates (34, 35) carry on their opposing wall faces (33a, 34a) cutting, separating and disintegrating knives (40, 140) penetrating into the drum inner space (31). Moreover, inlets (41, 42, 43) for wash water, for a sanitary liquid and for chemicals as well as derivations for the sucked solid constituents of the material to dispose of are provided.

19 Claims, 10 Drawing Sheets

METHOD AND DEVICE FOR THE IN SITU DISPOSAL OF INCONTINENCE ARTICLES

FIELD OF APPLICATION

The invention relates to a method and a device for the in situ disposal of incontinence articles, in particular made of a nonwoven fabric, of an absorbent cellulose layer, eventually with a gel embedded into the cellulose layer or with absorbent granulates, of an one-sided outer shell of synthetic material and of Velcro/adhesive strips, rubber straps or the like as closing and retaining means.

Through the DE-A-691 24 107, we know a method for the treatment of absorbent sanitary paper products for separating such products into their components or in components thereof which have a shape which is appropriate for the recycling or for the reutilization, whereby the products comprise at least synthetic, cellulose and superabsorbent polymer ("SAP") solid fractions, the method comprising the following steps: treatment of the products in disintegrated form in an aqueous solution bath in order to solve soluble material and to treat the SAP so that its sources are inhibited, prevented or reversed and separation of the solution of soluble material from at least one of the solid fractions.

The device used for carrying out this method comprises a rotatable tiltable cylindrical drum with a first and with a second end which can contain and/or receive an aqueous solution and which is tiltable from a horizontal position into a tilted position, tilted position in which the second end is lower than the first end, whereby the first end is configured for loading the product into the inner part of the drum and for containing the product therein, whereby the second end possesses an outlet for delivering the product out of the drum, besides means for rotating the drum in at least one of horizontal and tilted positions, means for tilting the drum from the horizontal position into the tilted position, whereby for the treatment of absorbent sanitary paper products in order to separate such products into their components or into components thereof, the form of which is appropriate for the recycling or for the reutilization, by using means for the separation of solids from liquids in the drum, there is a stirrer in the inside of the drum in order to cause a communicating of the product in the drum. This device and the device configured for this should achieve that absorbent sanitary paper products with superabsorbent polymer can be treated in such a way that a few components or all components of such products can be recovered in a form which facilitates the recycling or another use of these components. A disposal is not provided for.

Moreover, a method and a device for the disposal of sanitary waste is known from the DE-A-198 53 520. In order to reduce the volume and the weight of sanitary waste and to stop the nuisance through bad smells, the sanitary waste is first mechanically disintegrated before it is brought into contact with a sanitary liquid which contains water with a sanitary additive usable in transportable toilets in such a quantity that the cellulose contained in the sanitary waste with gel grains is dissolved together with the body excrements contained therein. The used sanitary liquid is evacuated into the sewer, the remaining rest of the crumbled sanitary waste substantially made of synthetic material being recycled after dewatering.

It is known that absorbent sanitary paper products are made of a nonwoven made of a liquid permeable material, for example of a liquid permeable membrane made of an appropriate synthetic material or of woven products made of cotton, of a rear layer impermeable to liquid, degradable plastic foils on starch base, woven fabric or rubber and an absorbent or adsorbent core of airlaid cellulose fluffs and/or of synthetic cellulose containing bound or unbound polypropylene filaments, hemp or of other adsorbent fiber materials. The core is enclosed or wrapped in a crepe envelope made of wet-strength paper layers or of a material with similar properties. The wrapping of the core can be naturally breathing, biodegradable, odour inhibiting or degradable or soluble in another manner. The core can also be made of a material made of superabsorbent polymer (SAP) material according to DE-A-691 24 107. Sanitary napkins and incontinence products use pressure sensitive adhesives for reclosable adhesive tape brackets or similar closing mechanisms. These incontinence products can also be provided with pressure sensitive adhesives for adhesive lines in order to be able to fix a fixture, for example in form of a lining, on the underwear of the female or the male wearing person. The use of absorbent sanitary paper products is, in fact, practically or necessary as well; however, the disposal thereof causes many problems. According to the known methods and by means of the known devices, such absorbent sanitary paper products can be treated so quickly that a few components of such products or all components thereof can be recovered in a form which facilitates the recycling or another use of these components.

Aim, Solution, Advantage

Thus, the aim of this invention is to create a method and a device of the above mentioned type with which incontinence articles can be decomposed into the individual components by using a high cutting and dividing effect in order to recycle in situ the obtained disintegrated solid components of the material to dispose of and thus to economically dispose of the whole product or to supply them to a central industrial processing installation, whereby a reduction of the forces to be applied for the disintegration and for the separation of the material to dispose of should be obtained, and furthermore the solid components adhering on the drum inner wall or the disintegrated solid components of the material to dispose of should be removed without a high expenditure of energy.

This aim is achieved with a device with the characteristics indicated in claim 1 and with a method with the method steps indicated in claim 6.

Accordingly, the device according to the invention for the disposal of incontinence articles consists of a basic housing preferably provided with a desk-type housing section in which are placed a device made of a drum-type housing with an upper filling opening and a cylindrical drum placed in the inner space of the housing, stationary or which can be set rotating alternately about a horizontal axis of rotation by means of a first driving device, with a filling opening for the material to dispose of and with two wall plates closing both drum openings on the front side, the first wall plate being connected with the drum housing and the second wall plate being configured displaceable by means of a second driving device in the drum rotation axis longitudinal direction or displaceable and rotatable about its center axis, whereby both front side drum wall plates carry on their opposing wall faces cutting, separating and disintegrating knives penetrating into the drum inner space, the housing containing the drum being provided with respectively one inlet or with a common inlet for the wash water, for a sanitary liquid for preventing odors and for chemicals, among others also for disinfectants in powder or liquid state, and the drum being connected in the area of its first stationary wall plate with one cylindrical hollow hub connected with the first driving device, a pump connected with the drum inner space by a discharge muff placed on the bottom of the drum-type housing, pump by means of which the wash water is sucked off from the drum inner space, with the components of the material to dispose of which are dissolved in the wash water, and discharged, a heating plate below the drum housing for drying the constituents of the material to dispose of which remained in the drum and which are not dissolved by the wash water, a vacuum cleaner type device for sucking off the dried non water soluble constituents of the material to dispose of which remained in the drum inner space through the hub and for sucking off the air from the inner space of the drum through the hole-type openings in the rotating drum wall for loosening and removing the solid constituents of the material to dispose of which are adhering to the inner drum wall face, a collecting receiver connected with the vacuum cleaner type device with a container, bag or sack receiving the sucked solid constituents of the material to dispose of, whereby the control of the supply for the washwater, for the sanitary liquid and for the chemical, the control of the first driving device for the drum rotation and the alternate back and forward motion of the drum and of the second driving device for the horizontal displacement of the displaceable wall plate of the drum and the control of the sucking device for the solid constituents of the material to dispose of from the drum inner space and for the control of the pump are combined in a program switching device or are controllable by means of a free programmable control.

The method according to the invention comprises the following method steps:

a.) filling of the drum of the disposal device with the material to dispose of, b.) filling of the drum with wash water heated to approximately 95° C., sanitary liquid for preventing odors and chemicals, c.) alternate control of the rotation motion of the drum, d.) variation of the size of the drum inner space and thus variation of the pressing power onto the material to dispose of in the drum inner space through horizontal to-and-fro displacement of the displaceable front wall plate of the drum by simultaneous disintegration of the material to dispose of, e.) discharge of the wash water with the constituents dissolved therein of the material to dispose of, f.) drying of the water insoluble constituents of the material to dispose of which remained in the drum inner space by simultaneous drum to-and-fro motion and, if necessary, disintegration into particles, g.) sucking off or discharge of the dried water insoluble constituents of the material to dispose of from the drum inner space into a disposal container, h.) sucking off of air from the drum inner space through the hole type openings in the drum wall and simultaneous entrainment (pull off effect) of the constituents of the material to dispose of which are adhering to the drum inner wall by simultaneously displacing the displaceable drum wall plate in direction of the stationary drum wall plate for reducing the drum inner space by simultaneously increasing the passage rate of the air through the hole type openings, i.) transmission of the air sucked off in step h.) with the solid disintegrated constituents of the material to dispose of and separation of the air and of the solid constituents with subsequent collecting of the solid constituents for disposal or to residual valuable substances or supplying as residual valuable substances to the corresponding circuit.

With the device according to the invention and by using this device appropriately, it is possible to economically dispose in situ of incontinence articles with the possibility to let off, as far as allowed, the single obtained components or, eventually, to pelletize them. Due to the fact that during the disintegrating process of the material to dispose of in the inner space of the drum of the disposal device the material to dispose of is enlarged in its size in a predetermined cycle and disintegrated, a pressing pressure onto the material to dispose of is generated in the inner space of the drum, this pressure assisting the disintegration of the material to dispose of by means of the knives working against each other on the front side wall plates of the drum without a high expenditure of force or energy being needed. After having removed the wash water with the constituents dissolved therein of the material to dispose of, the disintegrated solid component of the material to dispose of first remains in the inner space of the drum, this component being also sucked off by means of a vacuum cleaner type device from the inner space of the drum. Then there remain on the inner wall face of the drum solid particles of the disposal component adhering on the wall face which are removed by pulling-off the air from the inner space of the drum through the hole type openings in the drum wall. Due to the sucking off of the air out of the inner space of the drum, a so-called pull-off effect is generated for the plastics particles of the material to dispose of which are adhering on the drum wall face. Here also, the air passage rate through the hole type openings in the drum wall is controlled by the alternate variation of the size of the drum inner space so that, for a small inner space, a high air passage rate is achieved for a constant volume flow. The plastic particles of the material to dispose of are sucked off with the air by the vacuum cleaner type device and separated therein, whereby the thus obtained solid component of the material to dispose of is caught in a bag shaped device and supplied to the removal arrangement.

The particular advantage consists in the in situ disposal of the prepared incontinence articles, whereby a wardwise disposal is also possible, for example in old people's homes, hospitals and children's homes. A pelletizing of the residual valuable substances, such as plastics and cellulose, is also possible. Single quantities as well as bigger quantities of incontinence articles can be disposed of. Furthermore, all solids can be filtered out of the end product, for example by means of a filter, and are then pelletized. The whole process can be carried out at low temperatures and also by higher temperatures. It is advantageous to carry out the process for a short time at temperatures above 70° C. in order to obtain the dissolution of the pellets. The feeding of the device can be carried out manually or also mechanically and automatically, for example by means of conveying belts. The particular advantage which is achieved by the device according to the invention consists in the fact that an in situ disposal is possible without storage and without intermediate transports.

Advantageous configurations of the invention are the object of the subclaims.

According to a further advantageous configuration of the invention, the drum housing of the drum placed stationary in the housing is provided with a front side wall plate fixedly connected with the drum and with a front side wall plate displaceable in the drum rotation axis longitudinal direction and driven rotating about the drum rotation axis longitudinal direction with a withdrawal opening for the material to dispose of which is closable by means of flaps. The housing receiving the drum shows a withdrawal opening covering the closable drum withdrawal opening or aligned with the closable drum withdrawal opening with a conveying/compression screw attached to it for carrying away separated plastics or plastics particles.

Furthermore, the invention provides a configuration according to which the drum housing of the drum placed stationary in the housing is provided with a front side wall plate fixedly connected with the drum and with a front side wall plate displaceable in the drum rotation axis longitudinal direction and driven rotating about the drum rotation axis longitudinal direction with a withdrawal opening for the material to dispose of, whereby the housing receiving the drum shows a withdrawal opening covering the drum withdrawal opening or aligned therewith, which is closable by means of flaps, with a conveying/compression screw attached to it for carrying away separated plastics or plastics particles.

When the drum is driven rotating in the housing, the rotation of the drum is terminated by means of a control, when the withdrawal opening of the drum housing of the drum and the withdrawal opening of the housing are aligned with each other.

SHORT DESCRIPTION OF THE DRAWINGS

The object of the invention is represented as an example in the drawings.

Figure 6:
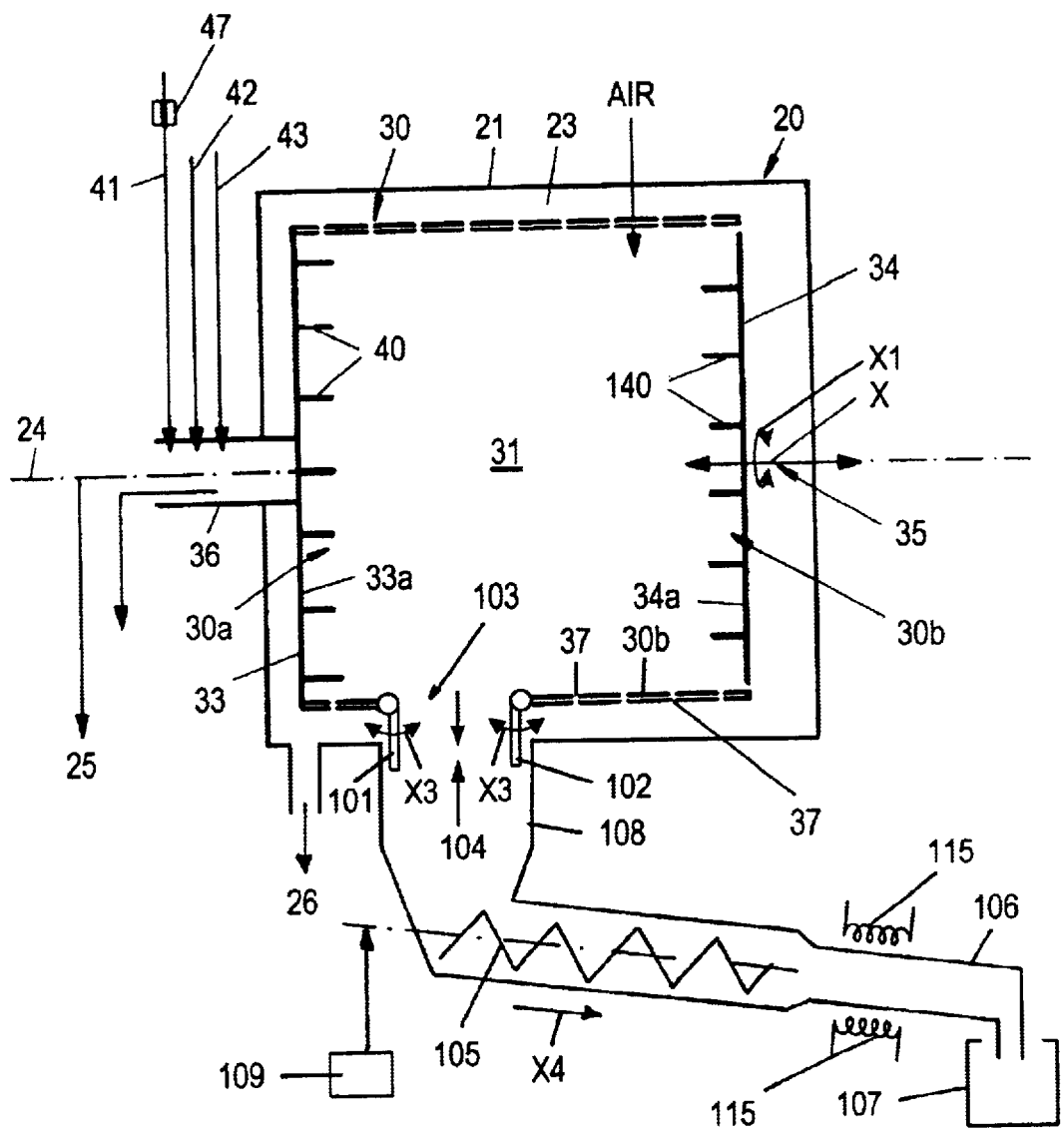

FIG. 6 shows a schematic representation of the stationary drum placed in the housing of the disposal device or of the drum driven rotating with a front side wall plate fixedly connected with the drum housing and with a front side wall plate displaceable in the drum rotation axis longitudinal direction and driven rotating about the drum rotation axis longitudinal direction, whereby the drum housing is provided with a withdrawal opening closable by means of flaps for the material to dispose of and the housing receiving the drum shows a withdrawal opening which coincides with the closable drum withdrawal opening with a conveying/compression screw attached to it for carrying off separated plastics or plastics particles.

Figure 7:
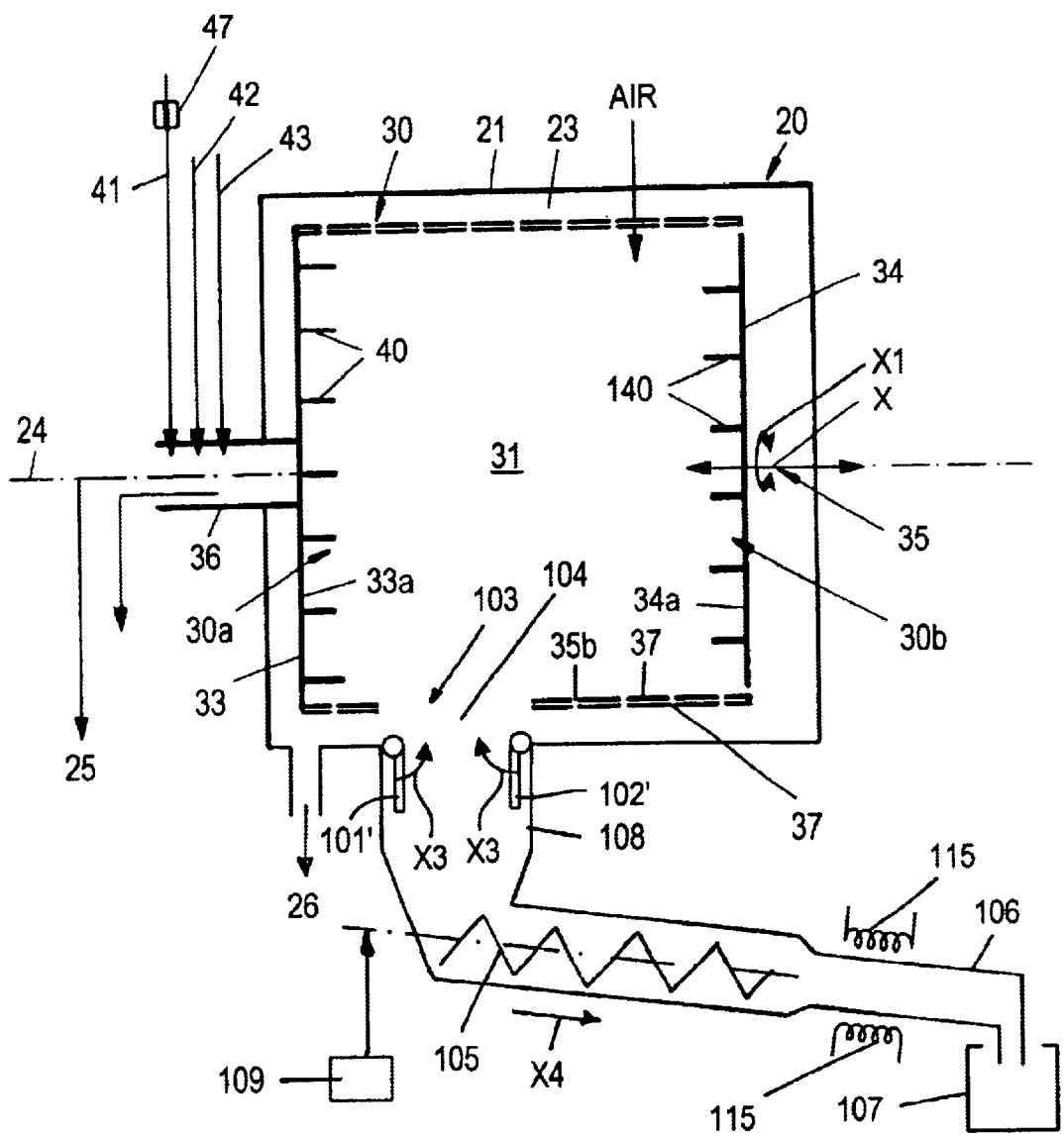

FIG. 7 shows a schematic representation of the stationary drum placed in the housing of the disposal device or of the drum driven rotating with a front side wall plate fixedly connected with the drum housing and with a front side wall place displaceable in the drum rotation axis longitudinal direction and driven rotating about the drum rotation axis longitudinal direction, whereby the drum housing is provided with a withdrawal opening for the material to dispose of and the housing receiving the drum shows a withdrawal opening closable by means of flaps, which coincides with the drum withdrawal opening, with a conveying/compression screw attached to it for carrying off separated plastics or plastics particles.

Figure 8:
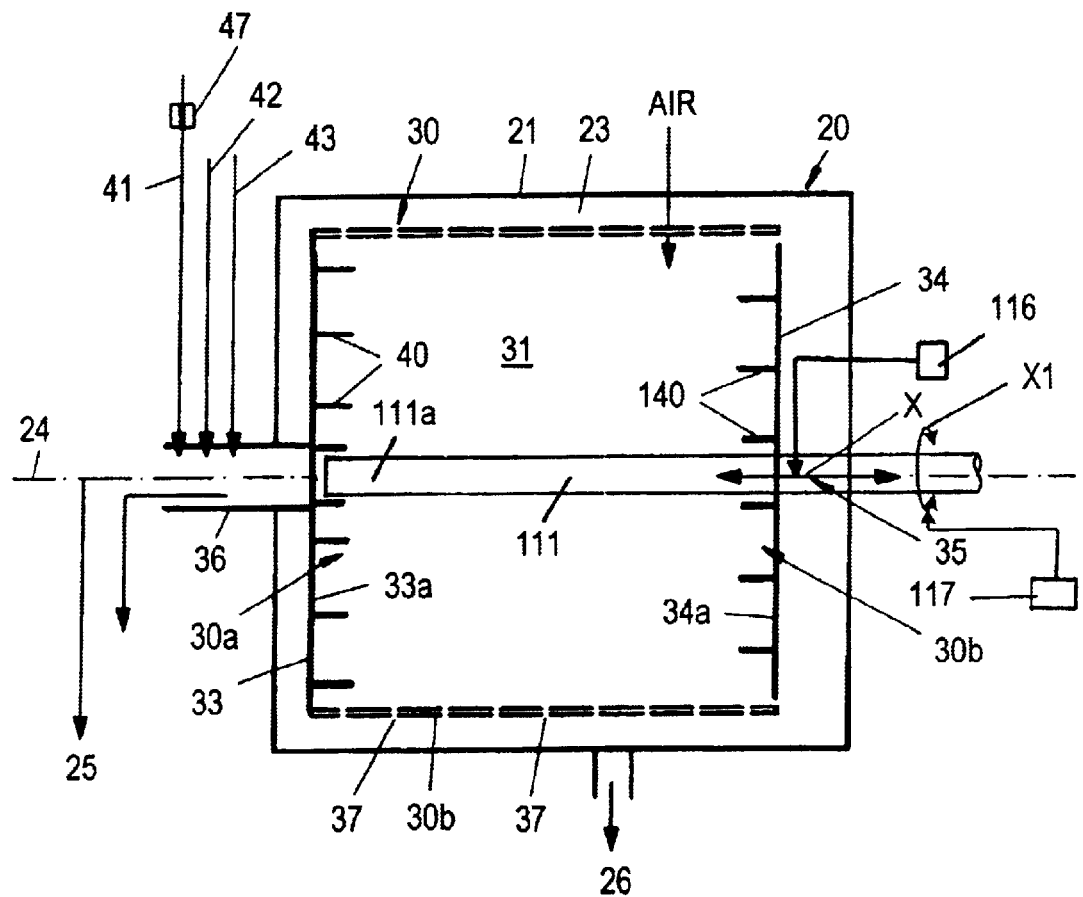

FIG. 8 shows a schematic representation of the drum placed in the housing of the disposal device with a front side wall plate fixedly connected with the drum housing and with a front side wall plate, displaceable in the drum rotation axis longitudinal direct on and driven rotating about the drum rotation axis longitudinal direction, which is placed on an axis extending through the inner space of the drum.

Figure 9:
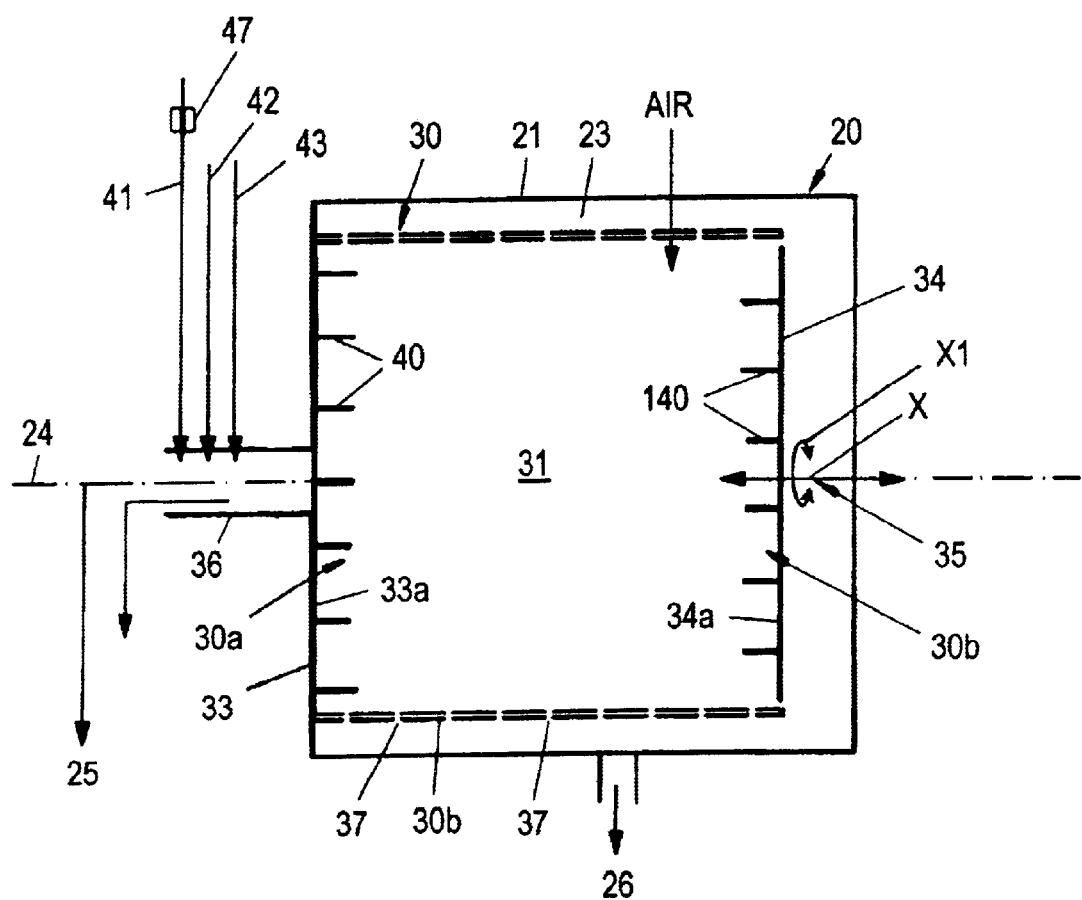

FIG. 9 shows a schematic representation of the stationary drum placed in the housing of the disposal device with a front side wall plate formed by the housing wall and with a front side wall plate displaceable in the drum rotation axis longitudinal direction and driven rotating about the drum rotation axis longitudinal direction.

Figure 10:
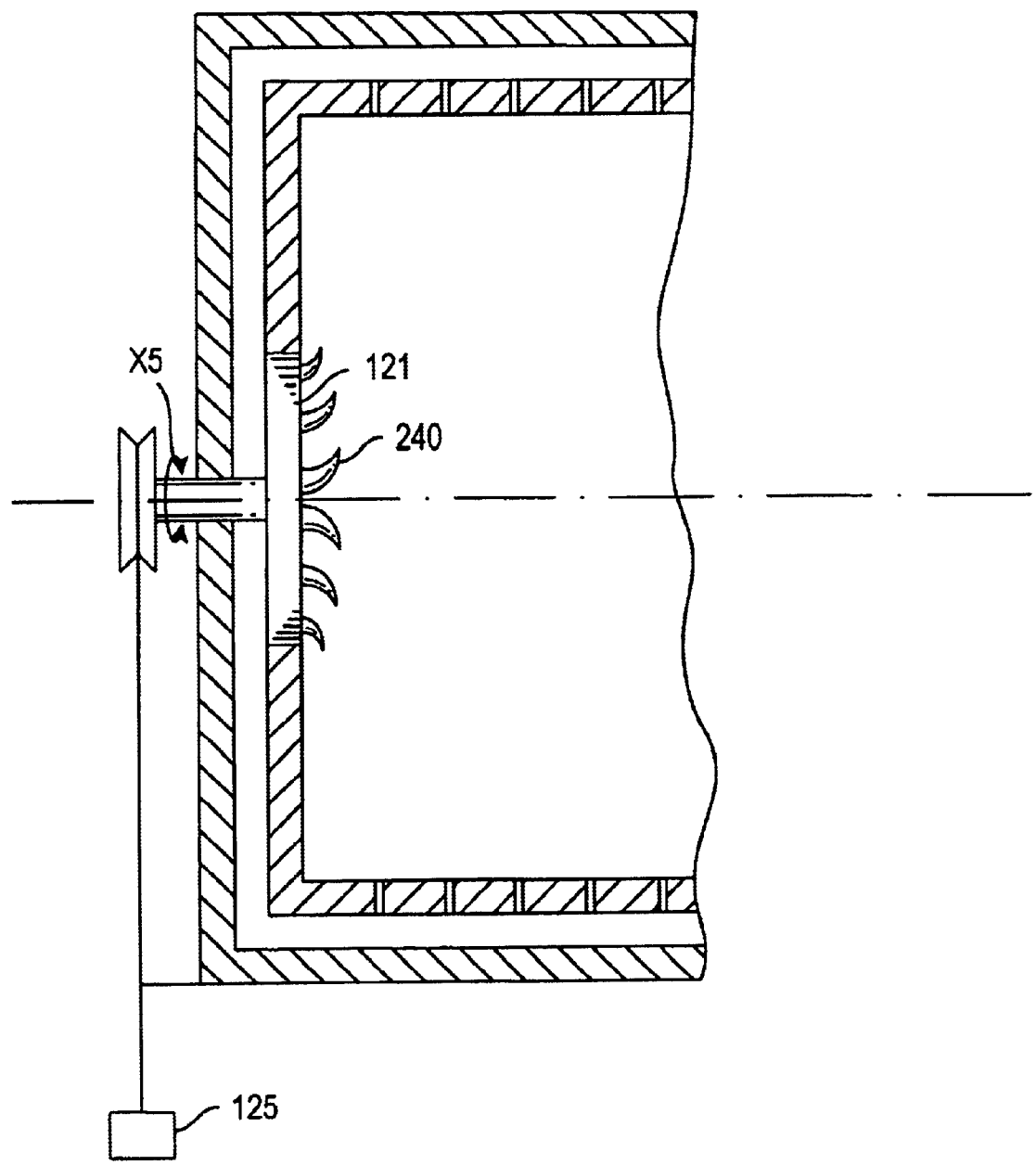

FIG. 10 shows a vertical partial section through the housing and the drum with a front side wall plate, fixedly connected with the drum housing, in which a quick rotating driven knives carrying disk is placed.

DETAILED DESCRIPTION OF THE INVENTION AND BEST WAY OF CARRYING OUT THE INVENTION

Figure 1:
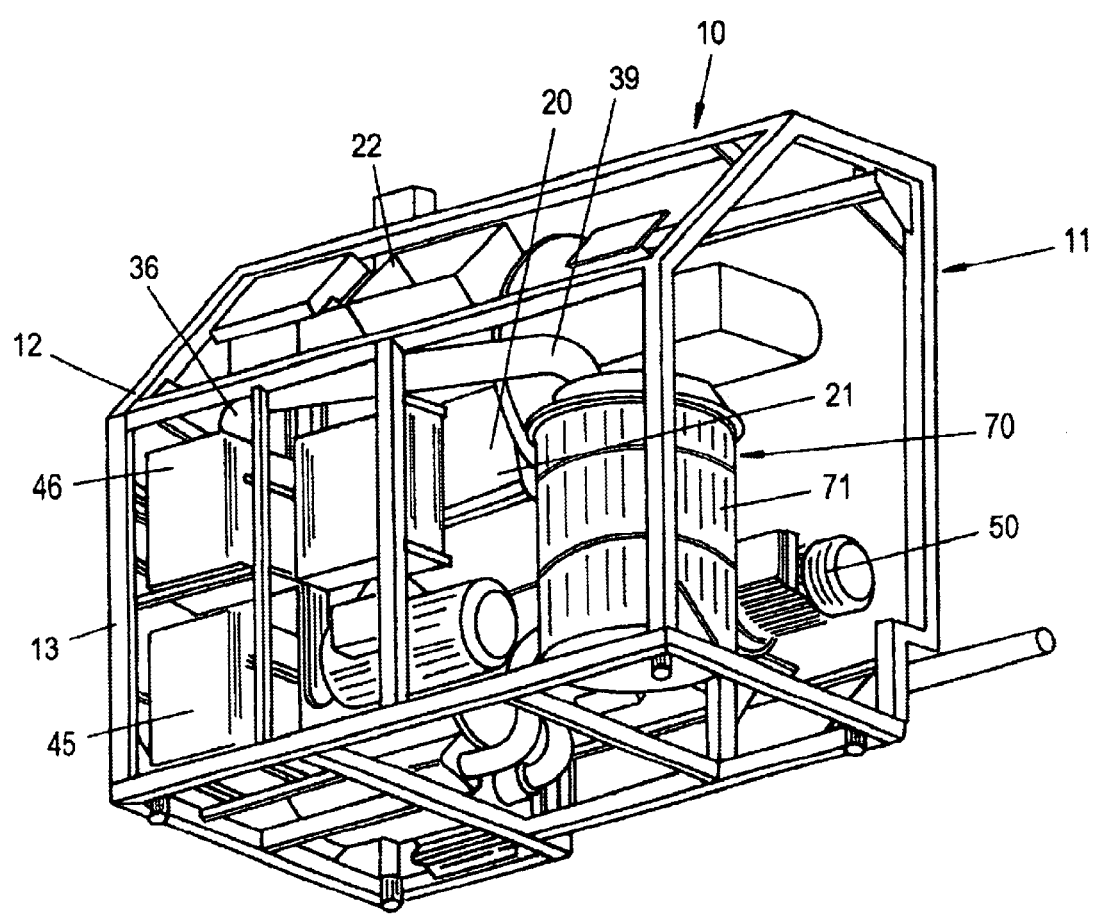
FIG. 1 shows a graphic front view of the disposal device, the wall sheathing being removed.
Figure 2:
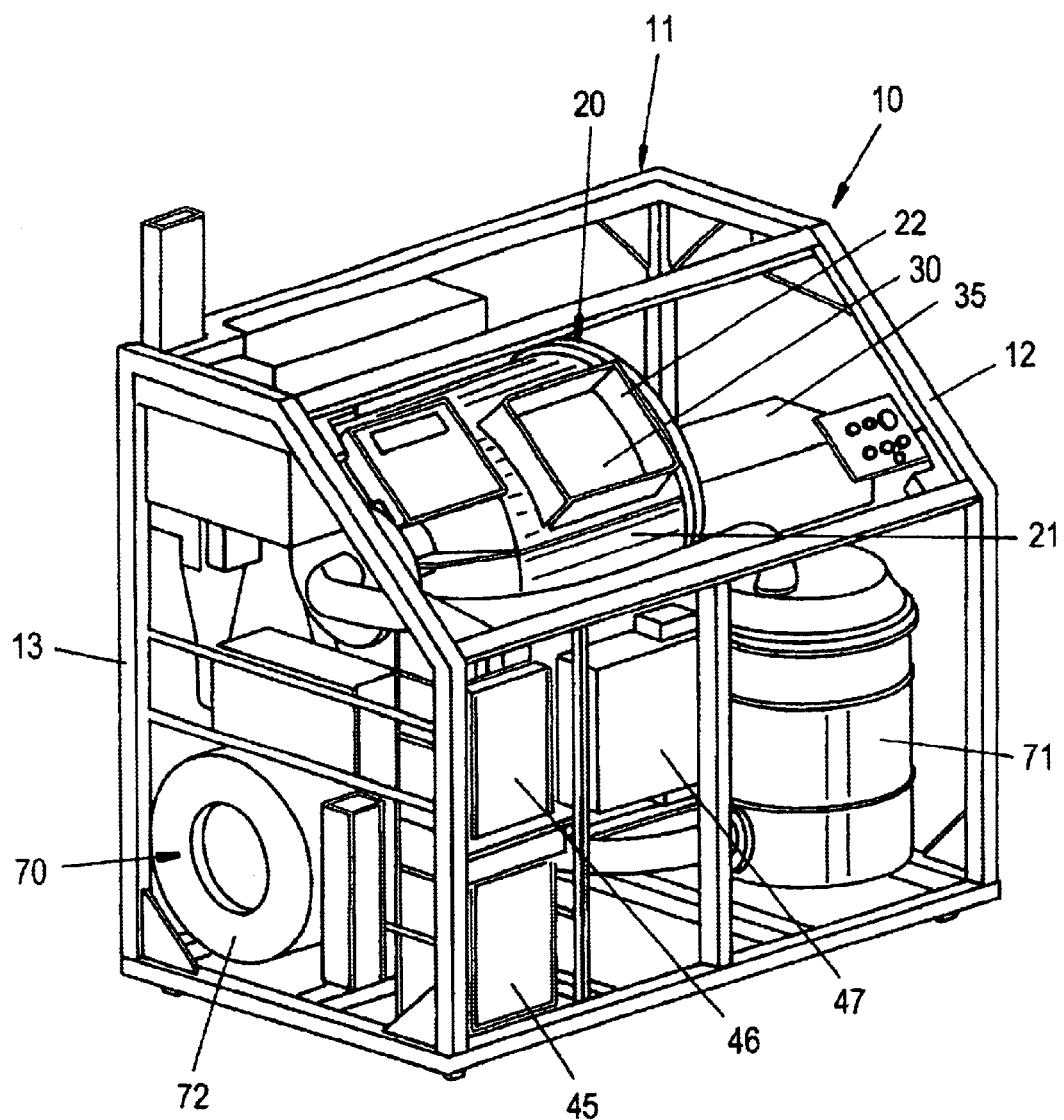
FIG. 2 shows a graphic side view of the disposal device, the wall sheathing being removed.
Figure 3:
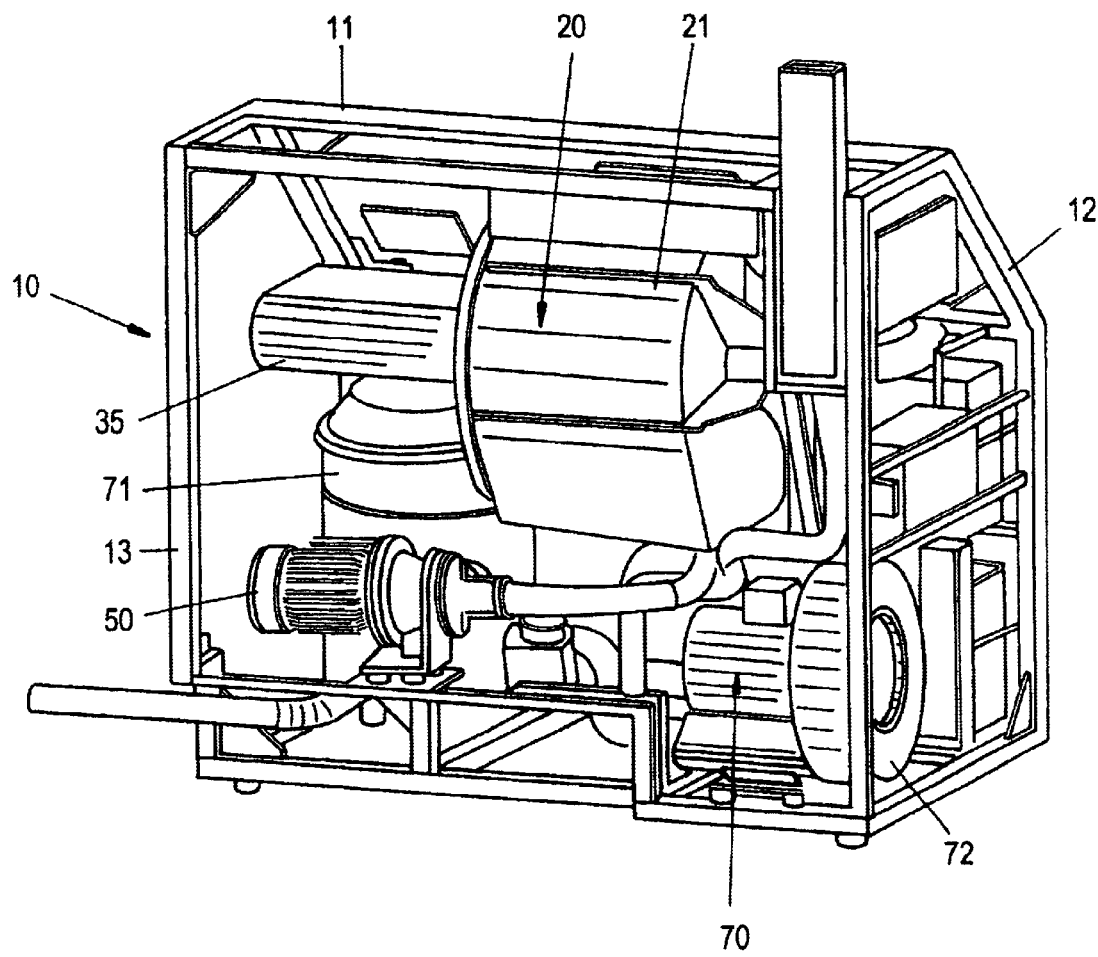
FIG. 3 shows a graphic rear view of the disposal device, the wall sheathing being removed.
Figure 4:
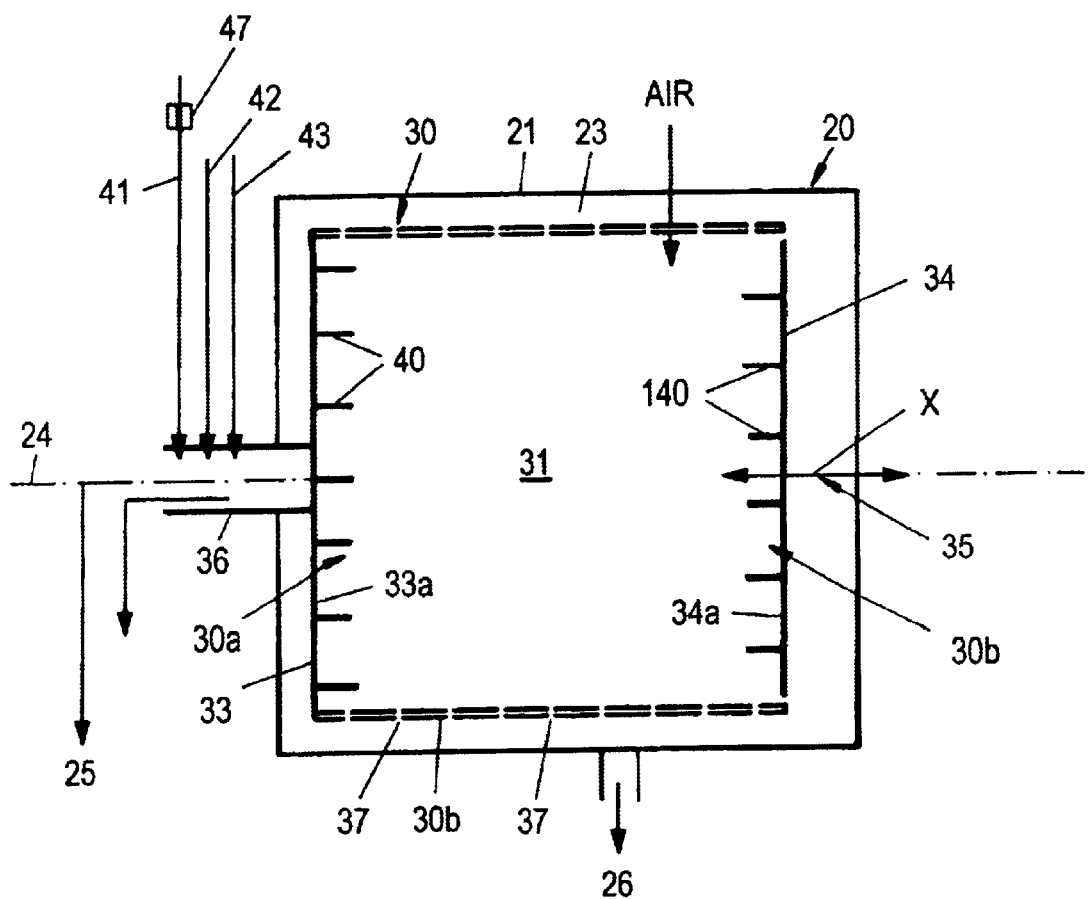
FIG. 4 shows a schematic representation of the drum placed in the housing of the disposal device with a stationary front side wall plate displaceable in the rotation axis longitudinal direction.
Figure 5:
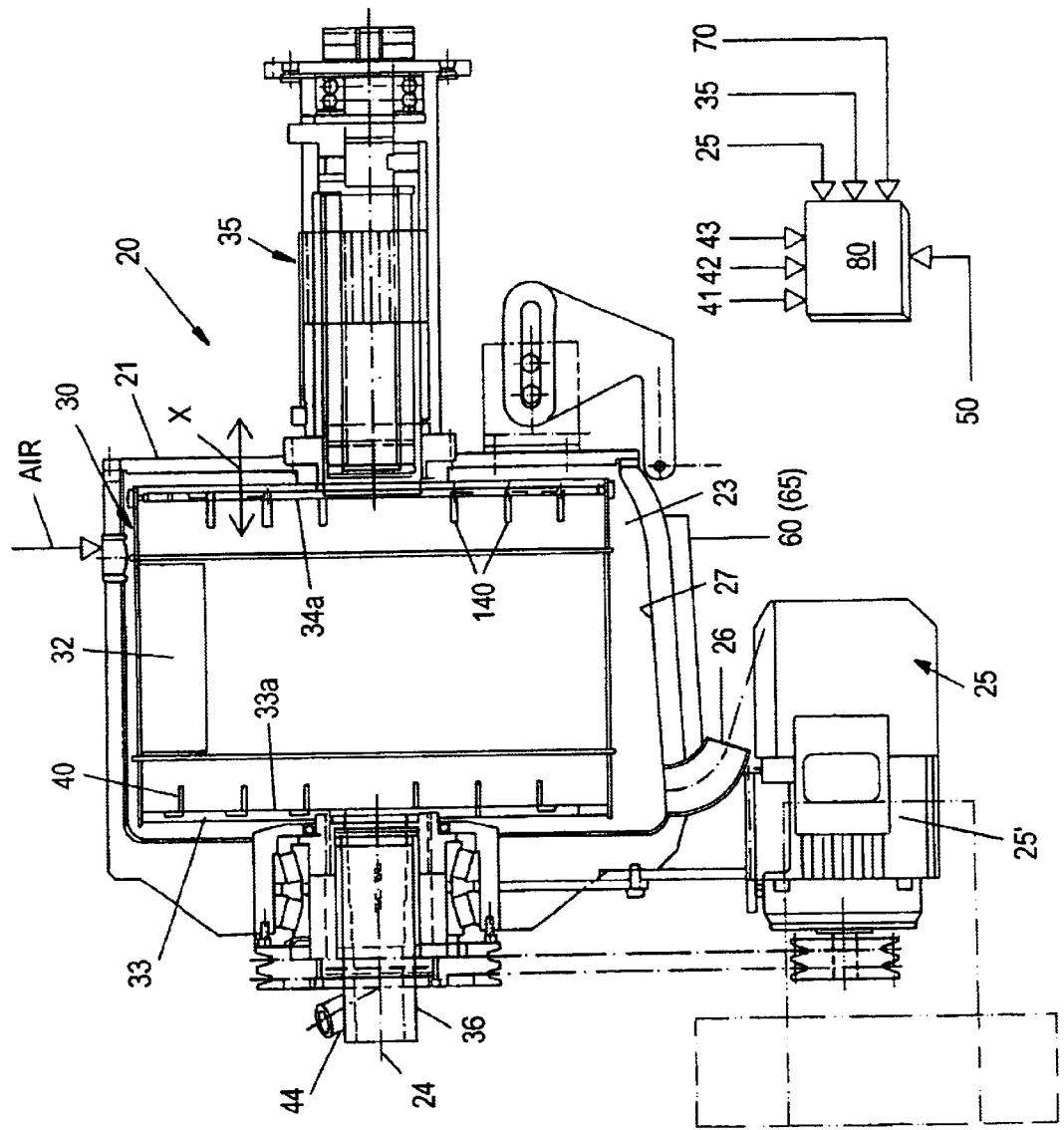
FIG. 5 shows the disposal device partly in a view and partly in a vertical section.

According to FIGS. 1 to 3, the device 10 for the disposal of incontinence articles consists of a basic housing 11 with a desk-type upper housing section 12. The basic housing 11 itself is formed by a frame mounting 13 which is cased by wall plates which are not represented in the drawing. A device 20 which consists of a drum type housing 21 with an upper filling opening 22 is placed in the frame mounting 13 of the basic housing 11. A discharge muff 26 is provided on the bottom 27 of the housing 21. The inner space of the drum type housing 21 is designated by 23. In the inner space 23 of the drum type housing 21 is placed a cylindrical drum 30 which can be set rotating about a horizontal rotation axis 24 alternating by means of a driving device 25. The driving device 25 is reversible so that the cylindrical drum 30 is rotating in a predetermined cycle as well in the one direction as in the other direction. The driving device 25 is preferably configured as a driving motor 25'. This driving motor 25' is connected over a belt drive with a hub or a muff 36 which is connected at the one end with the drum 30 over which the drum 30 is set rotating. The muff 36 is configured as a hollow cylinder (FIG. 5). The drum 30 is provided with a filling opening 32 for the material to dispose of.

The drum 30 is configured as a cylindrical hollow body and is configured open on the front side. Both drum openings 30a, 30b are closed with wall plates 33, 34, the wall plate 33 being stationary or fixedly connected with the housing of the drum 30 and the wall plate 34 being configured displaceable in the rotation axis longitudinal direction. The rotating wall of the drum 30 is provided with hole type openings 37.

The wall plate 34 displaceable in direction of the arrow X into the inner space 31 of the drum 30 is connected with a driving device 35 which is preferably configured as a spindle drive. However, it is also possible to carry out the displacement of the drum wall plate 34 hydraulically (FIG. 5).

Both drum wall plates 34, 35 carry on their opposing wall faces 33a, 34a cutting, separating and disintegrating knives 40, 140 which penetrate into the drum inner space 31. Among the two front side wall plates 34, 35, the wall plate 34 does not participate in the rotation motion of the drum 30, while the other wall plate 33, which is connected with the housing of the drum 30, rotates with the drum 30. The cutting, separating and disintegrating knives 40, 140 then comb with each other. Due to the displaceability of the front side wall plate 34 of the drum 30, the size of the inner space 31 of the drum 30 is changeable and can thus be adapted to the respective disintegration ratio.

The housing 21 receiving the drum 30 is provided with a supply 41 for wash water, a supply 42 for a sanitary liquid for the preventing of odours and a supply 43 for chemicals, for example for disinfectants, in powder or liquid state, whereby it is also possible for the supply to be single or to be carried out over a feeding muff 44 which is guided into the inner space of the hub 36, the inner space of which, on the other hand, is connected with the inner space 31 of the drum 30 (FIG. 5). The storage container 45 receives the chemicals and the storage container 46 the sanitary liquid (FIG. 2).

It is advantageous when the addition of wash water, sanitary liquid and of the chemicals takes place the one after the other. In the feeding duct 41 for the wash water is placed a heating device 47, for example a flow heater, for heating the wash water to approximatelx 95° C. (FIG. 2), whereby the heating device 47 can also be placed in the area of the housing 21 which receives the drum 30.

Furthermore, a pump 50 is placed in the frame mounting 13 of the basic housing 11. This pump 50 is connected with a discharge muff 26 which is provided on the bottom of the drum type housing 21 of the disposal device 10 and over which the wash water with the constituents of the material to dispose of, which are dissolved in the wash water, is sucked off from the drum inner space 31 and thus from the drum type housing 21, for example by means of a suction pump.

A heating plate 60 is placed below the drum housing 21 for drying the constituents of the material to dispose of which remain in the drum 30 and which are not dissolved by the wash water (FIG. 5).

A vacuum type device 70 is provided for sucking the dried non water soluble constituents of the material to dispose of which remain in the drum inner space 31 through the hub 36, device by means of which simultaneously the air is sucked from the inner space 31 of the drum 30 by the hole type openings 37 in the rotating drum wall 30b for detaching and removing the solid constituents of the material to dispose of which are adhering to the inner drum wall face. The device 70 shows a motor 72 over which the material which is in the drum inner space 31 is sucked. A collecting receiver 71 connected with the vacuum cleaner type device 70 serves for receiving the sucked solid constituents of the material to dispose of, whereby these constituents are received in a bag or sack which is placed in the collecting receiver 71. The inner space of the hub 36 or the hub 36 is connected with the collecting receiver 71 over a hose pipe 39 (FIG. 1).

The control of the supply for the wash water, for the sanitary liquid and for the chemical, the control of the driving device 25 for the drum rotation and for the alternate drum to-and-fro motion and of the driving device 35 for the horizontal displacement of the displaceable wall plate 34 of the drum 30 and the control of the sucking device 70 for the solid constituents of the material to dispose of from the drum inner space 31 and for the pump 50 are combined in a program switching device 80, whereby free programmable controls can also be used.

The device 10 according to the invention for the disposal of incontinence articles is used as follows:

The device 10 has approximately the function of a traditional washing machine. The drum 30 is filled with wash water and sanitary liquid as well as with chemicals, the latter having disinfecting properties. By admission of the washing liquid into the drum 30 or into the housing 31, which receives the drum 30, before it flows into the device 10, the washing liquid passes through a flow heater 41 so that it is heated to 95° C. The supply of the wash water, of the sanitary liquid and of the chemicals takes place through the hub 36 into the inner space 31 of the drum 30. Before the wash water, the sanitary liquid and the chemical are supplied, the material to dispose of is given in over the filling opening 21 or 32. Then, the setting into operation of the drum 30, which is set into rotation, takes place, that is a right-hand rotation and a left-hand rotation takes place alternately, namely in predetermined time intervals. During this movement of the drum 30, the displaceable wall plate is displaced on the front side of the drum 30 into the inner space 31 of the drum 30, thus in direction of the stationary wall plate 33. The displacement of the wall plate 34 also takes place in a predetermined rhythm, namely once in direction of the stationary wall plate and once in a direction against the stationary wall plate 33 so that the material to dispose of is compressed in the inner space 31 of the drum 30 and alternately decompressed. The material to dispose of is compressed by the continuous movement of the displaceable wall plate in a predetermined rhythm, whereupon then again a decompression phase takes place and again with a forward movement of the displaceable wall plate 34 the material to dispose of is compressed again. Simultaneously, a distribution, disintegration and splitting of the material to dispose of takes place by means of the cutting, separating and disintegrating knives 40, 140 on the opposing wall faces of the two wall plates 33, 34. The displaceable wall plate 34 is displaced against the stationary wall plate 33 until the cutting, separating and disintegrating knives 40, 140 comb with each other. Thus, a varying separating and cutting effect of the material to dispose of is achieved.

The arrangement of the cutting, separating and disintegrating knives 40, 140 to each other is varying so that respectively two knives 40, 140 cooperate with a small distance from each other, whereas two other cooperating knives 40, 140 move and are active with a bigger distance from each other. Due to this measure, the forces in the device are considerably reduced; the disintegrating and separation of the material to dispose of is thus possible with a lower expenditure of power and energy.

During the disintegration process, the material to dispose of, as far as it contains constituents soluble in water, is dissolved, whereby the cellulose fractions are decomposed into fibres. After all water soluble materials and substances of the material to dispose of are dissolved in the wash water, the wash water with the substances dissolved therein is pumped out by means of the pump 50.

Thus there remain only the solid constituents of the material to dispose of in the inner space 31 of the drum 30, whereby these solid constituents of the material to dispose of are all plastics parts, adhesive strips, rubber cords and the like. Since the rotating wall of the drum 30 is provided with hole type openings 37, the wash water with the fractions of the material to dispose of which are dissolved therein are pumped out.

The heating device 65 in form of a heating plate 60 placed below the housing 21 is set working and the heat produced by this heating device 65 is used for drying the solid constituents in the inner space 31 of the drum 30. The heating device 65 is also used during the dissolution process of the soluble constituents of the material to dispose of in the wash water when the water temperature decreases. Preferably, the water temperature for the dissolution process is maintained at 95° C.

The housing 21 is heated by means of the heating device 65 from below so that the air in the drum 30 and thus also the constituents of the material to dispose of which are in the drum inner space are also heated. During this heating process, the drum 30 is set rotating, that is alternately once in the one direction and once in the other direction so that the solid constituents can be detached from the inner wall face of the drum 30. The rests are sucked off from the drum over the hub 36. The drum is still moving, i.e. is further driven rotating. During this process, the inner space 31 of the drum 30 is also varyied in its size by displacing the displaceable wall plate 34 so that the air can flow exclusively through the hole type openings 37 in the wall of the drum 30. The sucking off of air out of the inner space 31 of the drum 30 takes place by means of the vacuum cleaner type device 70. The air is sucked off by means of this device through the hole type openings 37 in the wall of the drum 30, whereby simultaneously the constituents of the material to dispose of which adhere to the inner wall face of the drum 30 and which are in particular in the area of the hole type openings 37 are entrained by means of an achieved pull off effect. Due to this measure, an obstruction of the hole type openings 37 in the drum wall is avoided. A particularly high air passage rate is achieved when the inner space 31 of the drum 30 is maintained very small due to the corresponding displacement of the wall plate 34. This results in that all constituents of the material to dispose of, which adhere to the inner wall face of the drum 30 and which eventually close the hole type openings 37, are sucked off with the air. Due to the reduction of the inner space 31 of the drum 30, the air passage rate is increased by the hole type openings 37, and it is thus guaranteed that all the constituents of the material to dispose of which are adhering in the area of the hole type openings 37 are also evacuated. The air sucked off of the drum 30 and/or the housing 21 of the device 21 is separated from the solid constituents in the vacuum cleaner type device 70. The solid constituents are caught in a collecting receiver or a collecting bag. During the suction process, the drum 30 is further set rotating, namely until all solid constituents are sucked off. The sucked solid constituents are disposed of as solid residual particles over the collecting receiver as plastics waste.

For the embodiment shown in FIG. 6, the drum 30 is placed stationary in the drum 21. The front side wall plate 33 is connected with the housing 21 of the device, whereas the front side wall plate 34 is set rotating in direction of the arrow X1. Furthermore, the wall plate 34 is moved in direction of the arrow X. The drum housing of the drum 30 shows in the lower area a withdrawal opening 103, over which the material to dispose of is withdrawn out of the inner space 31 of the drum 30; in this case, a sucking off of the material to dispose of does not take place. The withdrawal opening 30 is closed in the operating state of the device by means of swivellable flaps 101, 102. Instead of flaps, other closing means can also be used such as, for example, slides or the like. The swivelling of the flaps 101, 102 takes place in direction of the arrow X3. Hydraulic, electromotor drives or other appropriate drives can be used as driving means for the flaps 101, 102.

The wall of the housing 21 also shows a withdrawal opening 103 which coincides with the withdrawal opening 103 of the drum 30 or which is aligned with it.

A conveying compressing screw 105 follows this withdrawal opening 104 of the housing 21, eventually by intercalating a funnel-shaped muff 108, this screw being driven by a drive 109 and compressing the plastics particles of the material to dispose of by a simultaneous forward movement in direction of the arrow X4 and feeding the compressed plastics particles of a tubular derivation 106 which preferably has a smaller diameter than the diameter of the conveying compressing screw 105. The plastics particles in form of pellets fed by the derivation 106 are softened in the derivation 106. The derivation 106 is heated for this purpose. The tubular derivation 106 is preferably surrounded by a heating spiral 115. However, other heating and warming devices can also be used. The aim of the softening of the plastics particles or of the plastics pellets is to reduce the recovery which otherwise exists for plastics or to eliminate it completely. The so treated plastics particles then come into a receiving container 107. During the disintegration process, the flaps 101, 102 are closed and are then opened after termination of the disintegration process for discharging the drum content. Besides plastics particles, plastics particles with cellulose particles/cellulose can also be processed in the same manner.

The device for disposal according to FIG. 7 is approximately constituted in the same way than the device for disposal described above and represented in FIG. 6, however with the difference that the flap closure for the withdrawal opening 103 of the drum 30 according to FIG. 6 is placed in the area of the withdrawal opening 104 in the housing 21 receiving the drum 30. The flaps are indicated here by 101', 102'.

Since, for the devices for disposal according to FIGS. 6 and 7, we start from a stationary drum 30 and a displaceable front side wall plate 34, which is also driven rotating about the drum rotation axis longitudinal direction 24 besides the horizontal displaceability, it is also possible to drive the drum 30 rotating. Such a device for disposal is constituted according to the devices for disposal described above and represented in FIGS. 6 and 7, only with the difference that the drum 30 is not placed stationary in its housing 21 but that it is driven rotating about its rotation axis 24. For the drum 30 driven rotating in the housing 21, the rotation of the drum 30 is terminated by means of a control which is not represented in the drawing, when the withdrawal opening 103 of the drum housing of the drum 30 and the withdrawal opening 104 of the housing 21 are aligned with each other. If this state is obtained, the flaps 101, 102 are then opened so that the drum content can be fed into the conveying compressing screw 105 or sucked off.

For the device for disposal according to FIG. 8, the forward movement and the return movement of the front side wall plate 34 of the drum 30 takes place by means of a spindle type drive 111. The spindle type configured driving axle 111 for the movement of the front side wall plate 34 of the drum 30 is guided through the inner space 31 of the drum 30 and is positioned with its free end 111a on the front side wall plate 33. The drive for the rotation of the wall plate 34 is placed in 116 and in 117 for the horizontal displacement.

If the device for disposal works with a stationary drum 30, according to FIG. 9 the front side wall plate 33 of the drum 30 can be formed by the side wall of the drum 21 in which the drum 30 is placed. The wall plate 33 is thus integrated into the front side wall of the housing 21 and carries the cutting, separating and disintegrating knives 40.

The horizontal movement of the wall plate 34 in the inner space 31 of the drum 30 is achieved with the spindle type drive 111. If the spindle type drive is guided as a shaft through the inner space 31 of the drum 30 and is positioned with its free end 111a on the front side wall plate 33, a stable torsion resistent constructive configuration of the drum 30 is achieved because the spindle type driving shaft 111 is positioned at both ends, namely once on the wall plate 33 and on the wall of the housing 21 which is opposed to the wall plate 34.

For the embodiment according to FIG. 10, a disk 121 driven rotating, in particular quick rotating, is positioned in the front side wall plate 33 of the drum 30, this disk carrying the cutting, separating and disintegrating knives 240 directed into the inner space 31 of the drum 30. The disk 121 carrying the knives 240 can be driven rotating by means of a drive 125 in direction of the arrow X5. The direction of rotation can then be selected any; in any case, the rotation of the disk 121 carrying the knives 240 should be contrary to the direction of rotation of the drum 30; however, the drum 30 can also be stationary. The advantage of the use of the disk 121 which carries the knives 240 and which is driven quick rotating, consists in the tearing and breaking up of interlocked and twisted plastics particles and threads which can lay about the spindle type driving shaft 111 during the operation of the device for disposal.

The disposal process with the device for disposal according to the invention can be carried out at low temperatures as well as at higher temperatures, for example above 70° C. At temperatures above 70° C., the pellets, which are in the incontinence articles, are dissolving. The operation at higher temperatures is simultaneously used for destructing germs. Higher temperatures are used only for short time, however not over the whole process duration. All solids can be filtered from the obtained end product by means of appropriate devices such as, for example, filters, whereby these solids can then be pelletized. During the process, the gel grains are dissolved out of the reticulated area of the incontinence articles, the individual cellulose fibres too. The water supply to the drum 30 is provided with devices in order to avoid a back pressure or a runback into the water feeding system. The pelletizing of the residual materials is also included, namely with reference to the plastics and/or celluloses.

What is claimed is:

1. A device for the in situ disposal of incontinence articles made of a nonwoven fabric, of an absorbent cellulose layer, with a gel embedded into the cellulose layer or with absorbent granulates, of an one-sided outer shell of synthetic material and of closing and retaining means, wherein the device (10) consists of a basic housing (11) in which are placed a device (20) made of a drum-type housing (21) with an upper filling opening (22) and a cylindrical drum (30) placed in an inner space (23) of the housing (21) so as to be one of stationary and rotatable about a horizontal axis of rotation (24) by a first driving device (25), the drum having a filling opening (32) for the material to dispose of and two wall plates (33, 34) closing both drum openings (30a, 30b) on the front side, the first wall plate (33) being connected with the drum housing and the second wall plate (34) being configured to be displaceable by a second driving device (35) in the drum rotation axis longitudinal direction, whereby both front side drum wall plates (33, 34) carry on their opposing wall faces (33a, 34a) cutting, separating and disintegrating knives (40, 140) that penetrate into the drum inner space (31), the housing (21) containing the drum (30) being provided with at least one inlet (41) for wash water, for a sanitary liquid for preventing odors and for chemicals, and the drum (30) being connected in the area of its first stationary wall plate (33) with one cylindrical hollow hub (36) connected with the first driving device (25), a pump (50) connected with the drum inner space (31) by a discharge muff (26) placed on the bottom of the drum-type housing (21), by means of which the wash water is sucked off from the drum inner space (31), with constituents of the material to dispose of which are dissolved in the wash water, and discharged, a heating plate (60) below the drum housing (21) for drying the constituents of the material to dispose of which remained in the drum (30) and which are not dissolved by the wash water, and a vacuum cleaner device (70) for sucking off the dried non water soluble constituents of the material to dispose of which remained in the drum inner space (31) through the hub (36) and for sucking off air from the inner space (31) of the drum (30) through hole-type openings (37) in the rotating drum wall (30b) for loosening and removing the solid constituents of the material to dispose of which are adhered to the inner drum wall face, a collecting receiver (71) connected with the vacuum cleaner type device (70) with a container receiving the sucked solid constituents of the material to dispose of, whereby the control of the supply for the washwater, for the sanitary liquid and for the chemical, the control of the first driving device (25) for the drum rotation and the alternate back and forward motion of the drum and of the second driving device (35) for the horizontal displacement of the displaceable wall plate (34) of the drum (30) and the control of the sucking device (70) for the solid constituents of the material to dispose of from the drum inner space (31) and the control of the pump (50) one of are combined in a program switching device (80) and are controllable by means of a free programmable control.

2. A device according to claim 1, wherein the hub (36) of the drum (30) is provided with a feeding muff (44) for the supply of the washing liquid, the sanitary liquid and the chemical.

3. A device according to claim 1, wherein a heating device (47) is placed in the feeding duct for the wash water for heating the wash water to substantially 95° C.

4. A device according to claim 3, wherein the heating device is a flow heater.

5. A device according to claim 1, wherein the second driving device (35) for the displacement of the second displaceable wall plate (34) on the front side of the drum (30) is configured as a spindle drive.

6. A device according to claim 1, wherein the cutting, separating and disintegrating knives (40, 140) are placed on the opposing wall faces (33a, 34a) of the two front side wall plates (33, 34) of the drum (30) opposite to each other and at different distances from each other for achieving a varying cutting and dividing effect in the drum (30) containing the material to dispose of.

7. A device according to claim 1, wherein the drum housing of the drum (30) placed stationary in the housing (21) with a front side wall plate (33) fixedly connected with the drum and with a front side wall plate (34) displaceable in the drum rotation axis longitudinal direction (24) and driven rotating about the drum rotation axis longitudinal direction (24) is provided with a withdrawal opening (103) closable by flaps (101, 102) for the material to dispose of, and the housing (21) receiving the drum (30) has a withdrawal opening (104) one of covering and aligned with the closable drum withdrawal opening (103), and having a conveying/compression screw (105) attached to the opening for carrying off separated plastics or plastics particles.

8. A device according to claim 7, wherein when the drum (30) is driven rotating in the housing (21), the rotation of the drum (30) is terminated by means of a control when the withdrawal opening (103) of the drum housing of the drum (30) and the withdrawal opening (104) of the housing (21) are aligned with each other.

9. A device according to claim 7, wherein a heatable derivation (106) which runs into a collecting container (107) follows the conveying/compression screw (105).

10. A device according to claim 1, wherein the drum housing of the drum (30) placed stationary in the housing (21) with a front side wall plate (33) fixedly connected with the drum and with a front side wall plate (34) displaceable in the drum rotation axis longitudinal direction (24) and driven rotating about the drum rotation axis longitudinal direction (24) is provided with a withdrawal opening (103) for the material to dispose of, and the housing (21) receiving the drum (30) has a withdrawal opening (104) one of covering and aligned with the drum withdrawal opening (103), which is closable by flaps (101', 102') and has a conveying/compression screw (105) attached to it for carrying off separated plastics or plastics particles.

11. A device according to claim 10, wherein when the drum (30) is driven rotating in the housing (21), the rotation of the drum (30) is terminated by means of a control when the withdrawal opening (103) of the drum housing of the drum (30) and the withdrawal opening (104) of the housing (21) are aligned with each other.

12. A device according to claim 1, wherein a spindle type drive causes the forward movement and the return movement of the front side wall plate (34) of the drum (30).

13. A device according to claim 1, wherein a driving axis (111) for movement of the front side wall plate (34) of the drum (30) is guided through the inner space (31) of the drum (30) and is positioned with a free end (111a) on the front side wall plate (33).

14. A device according to claim 1, wherein the front side wall plate (33) of the drum (30) is formed by the side wall of the housing (21) around which the drum (30) is placed.

15. A device according to claim 1, wherein a disk (121) driven to rotate is positioned in the front side wall plate (33) of the drum (30), the disk (121) carrying cutting, separating and disintegrating knives (240) directed into the inner space (31) of the drum (30), the rotation of the disk (121) taking place in either rotation direction.

16. A device according to claim 15, wherein the disk (121) rotates in a direction contrary to the rotation direction of the drum (30).

17. A device according to claim 1, wherein the basic housing (11) has a desk-type housing section (12).

18. A device according to claim 1, wherein the second wall plate (34) is configured to be displaceable and rotatable about its center axis.

19. A device according to claim 1, wherein a separate inlet is respectively provided for the wash water, the sanitary liquid and the chemicals.

* * * * *